US010497988B2

United States Patent
Oh et al.

(10) Patent No.: US 10,497,988 B2
(45) Date of Patent: Dec. 3, 2019

(54) BATTERY MODULE FOR CORRECTING CURRENT DIFFERENCE BETWEEN BATTERIES CONNECTED IN PARALLEL AND ELECTRONIC DEVICE INCLUDING THE BATTERY MODULE

(71) Applicant: Electronics and Telecommunications Research Institute, Daejeon (KR)

(72) Inventors: Jimin Oh, Daejeon (KR); Jung Hee Suk, Daejeon (KR); Yil Suk Yang, Daejeon (KR); Jong Pil Im, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 174 days.

(21) Appl. No.: 15/713,037

(22) Filed: Sep. 22, 2017

(65) Prior Publication Data

US 2018/0191037 A1 Jul. 5, 2018

(30) Foreign Application Priority Data

Jan. 4, 2017 (KR) ........................ 10-2017-0001562

(51) Int. Cl.
*H01M 10/46* (2006.01)
*H01M 10/44* (2006.01)
(Continued)

(52) U.S. Cl.
CPC ..... *H01M 10/441* (2013.01); *H01M 10/4207* (2013.01); *H01M 10/482* (2013.01);
(Continued)

(58) Field of Classification Search
CPC ......... H02J 2007/0049; H02J 2007/005; H02J 7/0021; H02J 7/0047
(Continued)

(56) References Cited

U.S. PATENT DOCUMENTS 5,280,231 A * 1/1994 Kato .................. G01R 31/3842
322/28
7,692,481 B2 4/2010 Roh et al.
(Continued)

FOREIGN PATENT DOCUMENTS

JP 2015-012683 A 1/2015

OTHER PUBLICATIONS

Radu Gogoana et al., "Internal resistance matching for parallel-connected lithium-ion cells and impacts on battery pack cycle life", Journal of Power Sources, vol. 252, Dec. 2013, p. 8-13.
(Continued)

*Primary Examiner* — Edward Tso
(74) *Attorney, Agent, or Firm* — Rabin & Berdo, P.C.

(57) ABSTRACT

Provided is a battery module and an electronic device, the battery module including a first battery, a second battery, a correcting element unit, and a battery controller, wherein the first battery includes a first internal resistance and provides a first current, the second battery is connected to the first battery, includes a second internal resistance and provides a second current, the correction element unit is connected to the first battery or the second battery and includes a variable resistor or a current source, the battery controller controls the correction element unit such that the first current is identical to the second current on a basis of a difference between values of the first internal resistance and the second internal resistance, and therefore performances of the first battery and the second battery are prevented from being deteriorated.

20 Claims, 9 Drawing Sheets

(51) Int. Cl.
   *H02J 7/00*     (2006.01)
   *H01M 10/42*    (2006.01)
   *H01M 10/48*    (2006.01)

(52) U.S. Cl.
   CPC .......... *H02J 7/0013* (2013.01); *H02J 7/0016* (2013.01); *H02J 7/0021* (2013.01); *H01M 2010/4271* (2013.01); *Y02T 10/7055* (2013.01)

(58) Field of Classification Search
   USPC ......... 320/107, 132, 149; 324/427, 428, 430
   See application file for complete search history.

(56) References Cited

U.S. PATENT DOCUMENTS

| | | | |
|---|---|---|---|
| 8,305,221 B2 | 11/2012 | Kim et al. | |
| 2006/0181245 A1* | 8/2006 | Mizuno | G01R 31/3648 320/132 |
| 2007/0229035 A1* | 10/2007 | Fukute | G01R 31/3648 320/132 |
| 2013/0285598 A1 | 10/2013 | Guang et al. | |

OTHER PUBLICATIONS

Naixing Yang et al., "Unbalanced discharging and aging due to temperature differences among the cells in a lithium-ion battery pack with parallel combination", Journal of Power Sources, vol. 306, Dec. 2015, p. 733-741.

Rae-Young Kim, "Development trend of cell balancing technology for Li-ion battery", KIPE(Korean Institute of Power Electronics) Magazine (ISSN 1226-623X), vol. 19, No. 6, Dec. 2014, p. 38-44.

* cited by examiner

BATTERY MODULE FOR CORRECTING CURRENT DIFFERENCE BETWEEN BATTERIES CONNECTED IN PARALLEL AND ELECTRONIC DEVICE INCLUDING THE BATTERY MODULE

CROSS-REFERENCE TO RELATED APPLICATIONS

This U.S. non-provisional patent application claims priority under 35 U.S.C. § 119 of Korean Patent Application No. 10-2017-0001562, filed on Jan. 4, 2017, the entire contents of which are hereby incorporated by reference.

BACKGROUND

The present disclosure herein relates to a battery module and an electronic device including the same, and more particularly, to management of a secondary battery.

A device using the Internet of Things (IoT), a wearable device, an Energy Storage System (ESS), a Hybrid Electric Vehicle (HEV)/Electric Vehicle (EV), etc. is a system capable of performing a desired function using a battery. Such a battery may be a battery for which only discharge is allowable, but may be a secondary battery that is chargeable and dischargeable in view of efficiency or convenience. The secondary battery may use a single cell, but there are many cases of using a battery module including a plurality of cells connected in series, in parallel, or in series and parallel.

Recently, an electronic device, such as an EV/HEV and an ESS, requiring a high voltage/high capacity energy storage source mainly adopts battery connections in a series and parallel matrix type. For serially connected batteries for a high voltage, since a current between the serially connected batteries is constant and voltages of respective batteries become different due to a difference in internal resistance, cell balancing is required which maintains a voltage between batteries constant in order to prevent the battery life from being lowered. For batteries connected in parallel for high capacity, cell balancing may be performed automatically, but since respective internal resistances of the batteries connected in parallel are different from each other, current values flowing through the batteries become different from each other. Accordingly, for a battery module including secondary batteries connected in parallel, a request is being raised for correcting current values of the respective batteries.

SUMMARY

The present disclosure provides a battery module in which performance deterioration is prevented, which is caused by an internal resistance difference between batteries connected in parallel, and an electronic device including the same.

An embodiment of the inventive concept provides a battery module including a first battery, a second battery, a first variable resistor, a second variable resistor, and a battery controller. The first battery includes a first internal resistance and the second battery includes a second internal resistance. The first battery and the second battery are connected in parallel. The first variable resistor is connected to the first battery in series, and the second variable resistor is connected to the second battery in series.

In an embodiment, the battery controller may control such that a first serial resistance value that is a sum of a value of the first internal resistance and a resistance value of the first variable resistor is identical to a second serial resistance value that is a sum of a value of the second internal resistance and a resistance value of the second variable resistor. The battery controller may control such that at least one of the first variable resistor and the second variable resistor has a minimum resistance value in a variable range.

In an embodiment, the battery controller may calculate a correction value that is an absolute value of a difference between the first serial resistance value and the second serial resistance value. The battery controller may compare the resistance value of the first variable resistor with the correction value, when the first serial resistance value is greater than the second serial resistance value. The battery controller may control to add the correction value to the resistance value of the second variable resistor, when the resistance value of the first variable resistor is smaller than the correction value. The battery controller may control to subtract the correction value from the resistance value of the first variable resistor, when the resistance value of the first variable resistor is greater than the correction value. The battery controller may compare the resistance value of the second variable resistor with the correction value, when the first serial resistance value is smaller than the second serial resistance value. The battery controller may control to add the correction value to the resistance value of the first variable resistor, when the resistance value of the second variable resistor is smaller than the correction value. The battery controller may control to subtract the correction value from the resistance value of the second variable resistor, when the resistance value of the second variable resistor is greater than the correction value.

In an embodiment of the inventive concept, a battery module includes a first battery, a second battery, a first current source, a second current source, and a battery controller. The first battery may provide a first current, and the second battery connected to the first battery in parallel may provide a second current. The first current source may be connected to the first battery and provide a third current. The second current source may be connected to the second battery and provide a fourth current.

In an embodiment, the battery controller may control the first current source and the second current source such that a first correction current that is a sum of the first current and the third current is equal to a second correction current that is a sum of the second current and the fourth current. The battery controller may add the first current to the second current to calculate a magnitude of a load current, and control the first current source and the second current source such that a sum of the first to fourth currents is equal to the magnitude of the load current. The battery controller may control the first current source and the second current source such that magnitudes of the first correction current and the second correction current are a half of the magnitude of the load current.

In an embodiment of the inventive concept, an electronic device includes a battery module and a load unit. The battery module generates a load current, and the load unit receives the load current.

In an embodiment, the battery module may include a first battery, a second battery, a correction element unit, and a battery controller. The first battery may include a first internal resistance and provide a first current. The second battery may include a second internal resistance and provide a second current. The first battery and the second battery are connected in parallel. The correction element unit may be connected to the first battery and the second battery. The correction element unit may include a first variable resistor and a second variable resistor and include a first current source and a second current source. The battery controller may control the correction element unit such that the first current is identical to the second current on a basis of a difference between values of the first internal resistance and the second internal resistance.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, an exemplary embodiment of the present disclosure will be described in detail with reference to the accompanying drawings such that a person skilled in the art may easily carry out the embodiments of the present disclosure.

Figure 1:
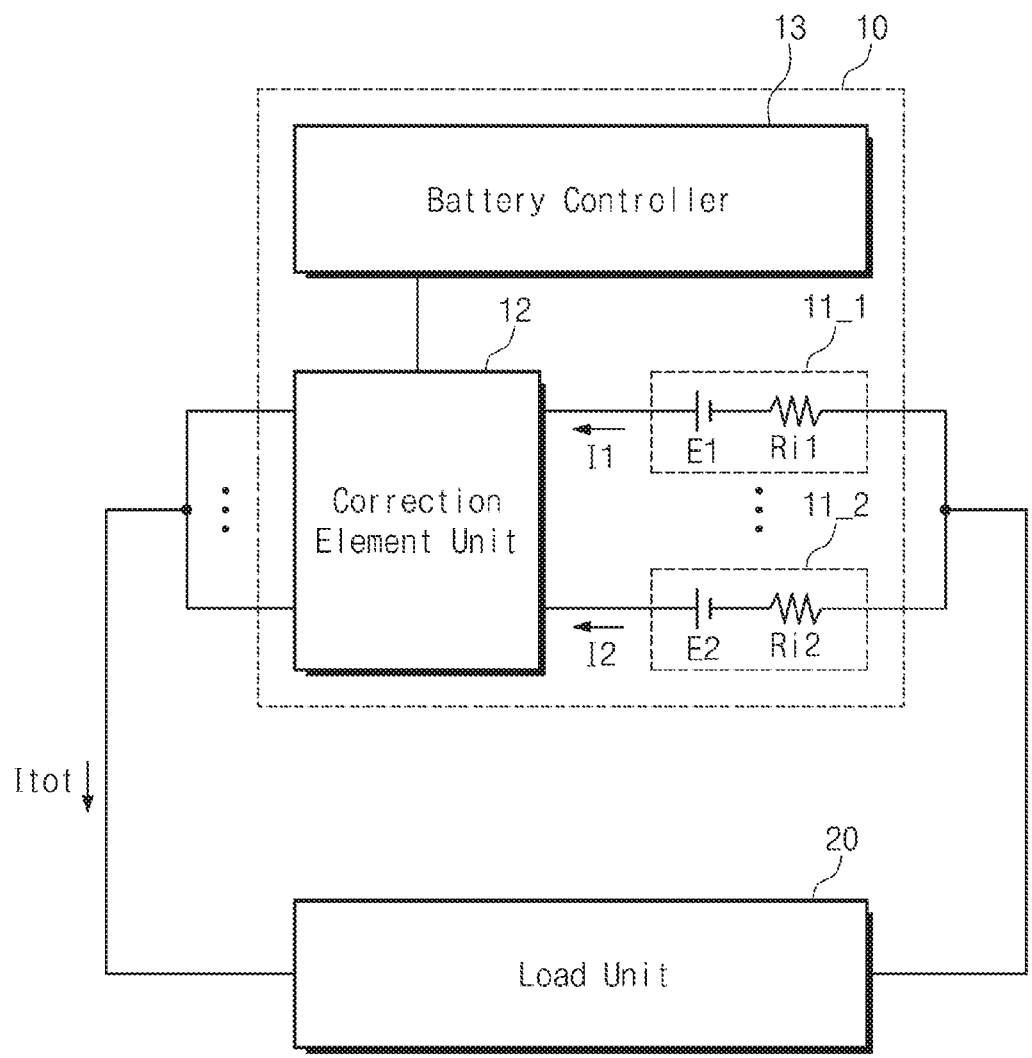
FIG. 1 is a block diagram of an electronic device according to an embodiment of the present inventive concept.

FIG. 1 is a block diagram of an electronic device according to an embodiment of the present inventive concept.

Referring to FIG. 1, an electronic device 100 includes a battery module 10 and a load unit 20. The battery module 10 includes a first battery 11_1, a second battery 11_2, a correction element unit 12, and a battery controller 13.

The battery module 10 provides a load current Itot to the load unit 20. When the load current Itot is positive, the battery module 10 may operate in a discharge mode. When the load current Itot is negative, the battery module 10 may operate in a charge mode.

The first battery 11_1 and the second battery 11_2 are connected in parallel. Although the two batteries are illustrated in FIG. 1, the present inventive concept is not limited thereto, and the battery module 10 may include a plurality of batteries connected in parallel. For example, the electronic device 100 requiring high capacity may be configured to have more batteries connected in parallel. For convenience of explanation, it is assumed that the battery module 10 includes two batteries. A cathode terminal of the first battery 11-1 and a cathode terminal of the second battery 11-2 are electrically connected, and an anode terminal of the first battery 11-1 and an anode terminal of the second battery 11_2 are electrically connected. The first battery 11_1 provides a first current I1 to the load unit 20 and the second battery 11_2 provides a second current I2 to the load unit 20. For an ideal case, a sum of the first current I1 and the second current I2 are the same as the load current Itot.

The first battery 11_1 includes a first power source E1 and a first internal resistance Ri1. The second battery 11_2 includes a second power source E2 and a second internal resistance Ri2. The first power source E1 and the second power source E2 may provide the same voltage. The first internal resistance Ri1 and the second internal resistance Ri2 may have the same value. In this case, a current provided to the load unit 20 is identically shared by the first battery 11_1 and the secondary battery 11_2. When characteristics of the first battery 11-1 and the second battery 11_2 are identical, since discharge and charge efficiencies of the first battery 11_1 and the second battery 11_2 are identical, lowering of the battery life is prevented which is caused by charging/discharging inequality between the first battery 11_1 and the second battery 11_2.

The first battery 11_1 and the second battery 11_2 may be secondary batteries. In other words, the first battery 11_1 and the second battery 11_2 may operate in a charge mode or discharge mode. For example, the first battery 11_1 and the second battery 11_2 may be chargeable/dischargeable lithium ion batteries, lithium polymer batteries, or lead-acid batteries. In the typical electronic device 100, the first battery 11-1 and the second battery 11_2 may be randomly charged/discharged. In this case, the first internal resistance Ri1 and the second internal resistance Ri2 may have values frequently changed according to the randomly charging/discharging operation. In this case, the characteristics of the first battery 11_1 and the second battery 11_2 may be changed and the first current I1 may be not identical to the second current I2. In particular, when the first internal resistance Ri1 is not identical to the second internal resistance Ri2, charging/discharging may unequally occur to cause overcharge or deep discharge and the battery life may be lowered.

The correction element unit 12 is electrically connected to the first battery 11_1 and the second battery 11_2. The correction element unit 12 is configured to correct a current difference occurring according to changes in characteristics of the first battery 11_1 and the second battery 11_2. The correction element unit 12 may include a first correction element electrically connected to the first battery 11_1 and a second correction element electrically connected to the second battery 11_2. In other words, the number of correction elements included in the correction element unit 12 may correspond to the number of batteries. The correction element unit 12 may be configured such that the first current I1 and the second current I2 have an identical value. Alternatively, the correction element unit 12 may be configured to correct an internal resistance difference between the first battery 11_1 and the second battery 11_2. A detailed description thereabout will be provided later.

The battery controller 13 controls an operation of the battery module 10. The battery controller 13 may include a logic circuit for providing a rated voltage or a rated current suitable for the load unit 20. The battery controller 13 may be electrically connected to the correction element unit 12. The battery controller 13 may control the correction element unit 12 such that the first current I1 and the second current I2 have a substantially identical value. The battery controller 13 may manage the charge mode or discharge mode of the battery module 10. Besides, the battery controller 13 may perform various functions for managing the battery module 10. The battery controller 13 may be realized to be able to perform a logic circuit operation like a micro controller unit (MCU) or a field programmable gate array (FPGA). A detailed description thereabout will be provided later.

The load unit 20 may include various electronic devices for performing a function of the electronic device 100. For example, when the electronic device 100 is an electric vehicle such as an HEV/EV, the load unit 20 may include a driving circuit for driving the electric vehicle. The load unit 20 may use the battery module 10 formed of a plurality of batteries connected in parallel to obtain high capacity energy. The load unit 20 may receive the load current Itot or the load voltage from the battery module 10. The load unit 20 may have a rated voltage or a rated current for circuit driving, and the battery module 10 may output the load voltage or load current Itot to correspond to the rated voltage or the rated current of the load unit 20.

Figure 2:
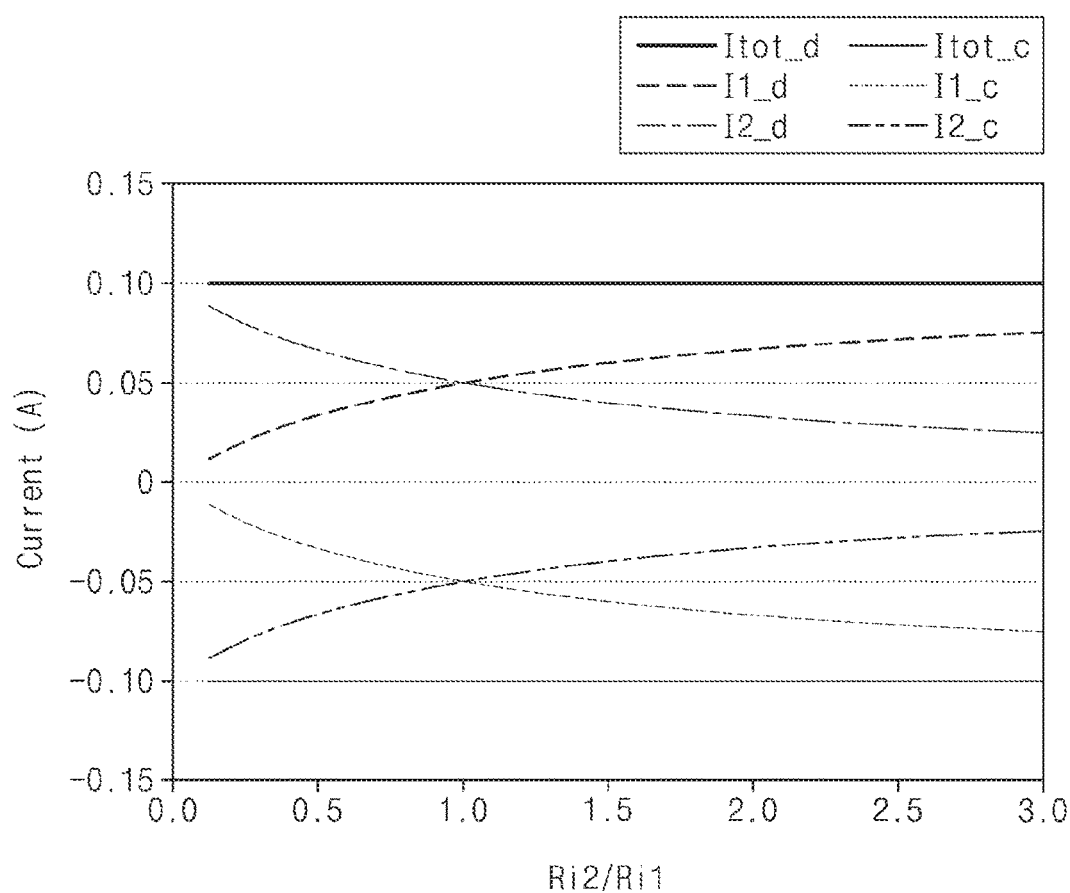
FIGS. 2 and 3 are graphs illustrating a current flow in a battery module according to a change in ratio of a second internal resistance to a first internal resistance.
Figure 3:
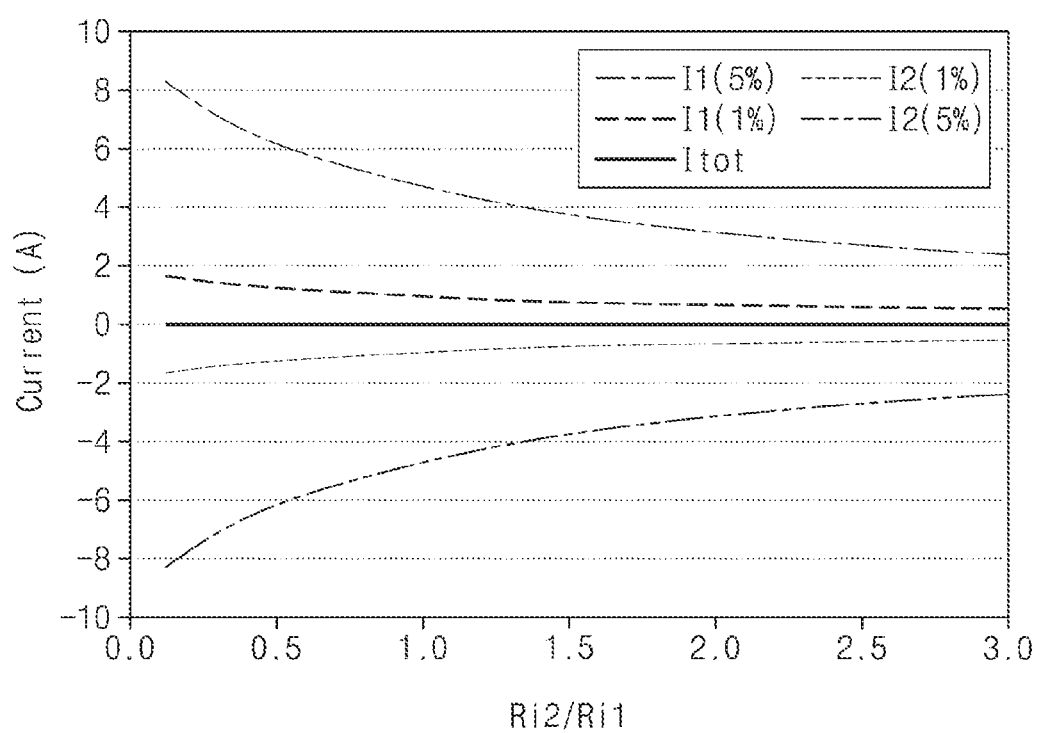

FIGS. 2 and 3 are graphs illustrating a current flow in a battery module according to a change in ratio of a second internal resistance to a first internal resistance. FIGS. 2 and 3 are graphs for explaining an operation of the battery module 10 in case where the correction element unit 12 is not driven. In other words, in FIGS. 2 and 3, it is assumed that there is no correction by the correction element unit 12 according to a change in the first internal resistance Ri1 or the second internal resistance Ri2.

FIG. 2 illustrates a charge/discharge current of the first current I1, the second current I2, and the load current Itot according to a change in ratio of the second internal resistance Ri2 to the first internal resistance Ri1. Both of the first power source E1 and the second power source E2 in FIG. 2 are assumed to have 3.7 V. The load current Itot is divided into a load current Itot_d at the time of discharging and a load current Itot_c at the time of charging. The load current Itot_d at the time of discharging represents 0.1 A and the load current Itot_c at the time of charging represents −0.1 A. The first current I1 is divided into a first current I1_d at the time of discharging and a first current I1_c at the time of charging. The second current I2 is divided into a second current I2_d at the time of discharging and a second current I2_c at the time of charging. The first internal resistance Ri1 is fixed to 20 mohms and the second internal resistance Ri2 changes from 2.5 mohms to 60 mohms. In other words, the ratio of the second internal resistance Ri2 to the first internal resistance Ri1 changes from ⅛ to 3.

In a discharging operation, regardless of the change in ratio of the second internal resistance Ri2 to the first internal resistance Ri1, a sum of the first current I1_d and the second current I2_d satisfies 0.1 A that is the load current Itot_d. However, a ratio between the first current I1_d and the second current I2_d changes according to a change in the second internal resistance Ri2. When the first internal resistance Ri1 is identical to the second internal resistance Ri2, the first current I1_d and the second current I2_d have an identical value of 0.05 A. When the first internal resistance Ri1 has a larger value than the second internal resistance Ri2, the first current I1_d has a smaller value than the second current I2_d. When the first internal resistance Ri1 has a smaller value than the second internal resistance Ri2, the first current I1_d has a larger value than the second current I2_d. Similarly in a charging operation, regardless of the change in ratio of the second internal resistance Ri2 to the first internal resistance Ri1, a sum of the first current I1_c and the second current I2_c satisfies −0.1 A that is the load current Itot_c, and a ratio between the first current I1_c and the second current I2_c changes according to a change in the second internal resistance Ri2.

For a single cell including one battery, the characteristics of the battery depends on an internal resistance and a power source, and even when the internal resistance changes according to a cycle characteristic, a constant load current is output to achieve a current required by the load unit. On the other hand, in the battery module 10 in which the plurality of batteries are connected in parallel, although the characteristics of the first battery 11_1 are not changed, the magnitude of the first current I1 output by the first battery 11_1 is changed according to a characteristic change of the second cell 11_2.

In FIG. 3, the first current I1, the second current I2, and the load current Itot are illustrated according to a change in internal resistance. The first power source E1 of the first battery 11-1 is fixed to 3.7 V. The second power source E2 of the second battery 11_2 is divided into a case of 3.663 V that is lower by 1% than the first power source E1 and a case of 3.515 V that is lower by 5% than the first power source E1. The ratio of the second internal resistance Ri2 to the first internal resistance Ri1 changes from ⅛ to 3 as in FIG. 2.

When the second power source E2 has a lower voltage than the first power source E1, a load voltage of the battery module 10 may have a lower level than the first power source E1. In other words, the voltage level of the first power source E1 is lowered by the first internal resistance Ri1. When the load current Itot is fixed to 0 as in FIG. 3, the first current I1 and the second current I2 have opposite polarities and the same magnitude. Accordingly, an operation may be performed in which the first battery 11_1 is discharged and the second battery 11_2 is charged. As a voltage level difference between the first power source E1 and the second power source E2 becomes larger, the charging/discharging operation may occur actively in a state where the load unit 20 is not connected, power consumption occurs due to the first internal resistance Ri1 and the second internal resistance Ri2, the life of the battery module 10 is reduced according to a change in the first internal resistance Ri1 or the second internal resistance Ri2, and a charging/discharging efficiency is reduced.

Referring to the graphs of FIGS. 2 and 3, a difference between the first internal resistance Ri1 and the second internal resistance Ri2, and a difference between the first power source E1 and the second power source E2 in the battery module 10 in a state of an open circuit voltage (OCV) influence the performance of the battery module 10. Even when the voltage difference between the first power source E1 and the second power source E2 is not overcome in a manufacturing process, the life of the battery module 10 may be enhanced.

Figure 4:
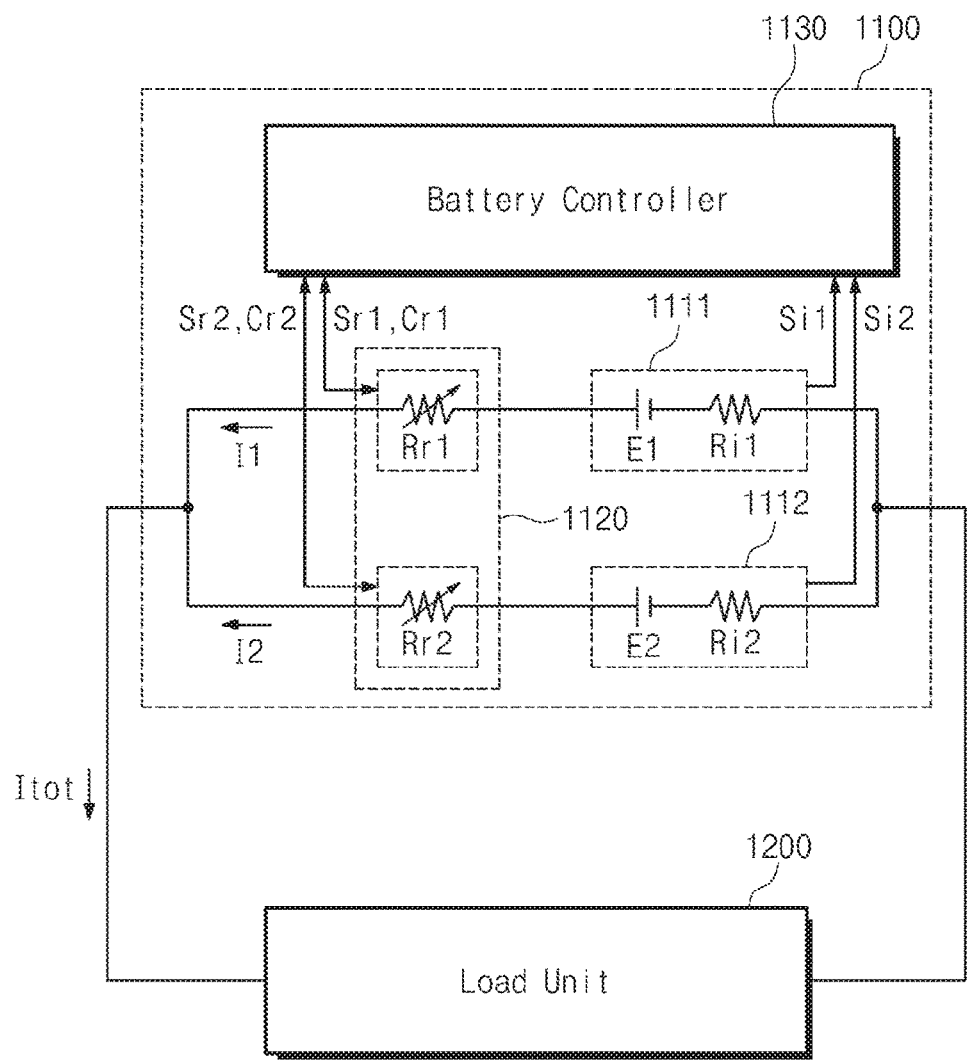
FIG. 4 is a block diagram of an electronic device according to an embodiment of the present inventive concept.

FIG. 4 is a block diagram of an electronic device according to an embodiment of the present inventive concept.

Referring to FIG. 4, an electronic device 1000 includes a battery module 1100 and a load unit 1200. The battery module 1100 corresponds to the battery module 10 of FIG. 1, and the load unit 1200 corresponds to the load unit 20 of FIG. 1. The battery module 1100 includes a first battery 1111, a second battery 1112, a correction element unit 1120, and a battery controller 1130. The first battery 1111 corresponds to the first battery 11_1 of FIG. 1, and the second battery 1112 corresponds to the second battery 11_2 of FIG. 1. The correction element unit 1120 corresponds to the correction element unit 12 of FIG. 1, and the battery controller 1130 corresponds to the battery controller 13 of FIG. 1.

The correction element unit 1120 includes a first variable resistor Rr1 and the second variable resistor Rr2. The first variable resistor Rr1 is serially connected with the first battery 1111. The first variable resistor Rr1 is connected to a cathode terminal or an anode terminal of the first battery 1111. The second variable resistor Rr2 is serially connected with the second battery 1112. The second variable resistor Rr2 is connected to a cathode terminal or an anode terminal of the second battery 1112. The resistance values of the first variable resistor Rr1 and the second variable resistor Rr2 may be changed in various manners. For example, the first variable resistor Rr1 and the second variable resistor Rr2 may be dial type variable resistors, or may include active elements like MOSFET elements and the resistance values thereof may be changed through the active elements.

The first variable resistor Rr1 and the second variable resistor Rr2 correct a difference between the first current I1 and the second current I2 due to a value difference between the first internal resistance Ri1 and the second internal resistance Ri2. The first variable resistor Rr1 and the second variable resistor Rr2 are controlled such that a sum of the resistance value of first variable resistor Rr1 and the value of the first internal resistance Ri1 is the same as a sum of the resistance value of the second variable resistor Rr2 and the value of the second internal resistance Ri2. In this case, the first current I1 and the second current I2 have an identical value. Accordingly, when the first power source E1 and the second power source E2 provide an identical voltage, energies consumed by the first battery 1111 and the second battery 1112 are identical, and possibility that the first battery 1111 or the second battery 1112 is overcharged or deeply discharged is reduced. Even when the first power source E1 and the second power source E2 do not provide an identical voltage and have a small voltage difference therebetween, since a difference between energies consumed by the first battery 1111 and the second battery 1112 is reduced, the life of the battery module 1110 may increase.

The battery controller 1130 controls the resistance values of the first variable resistor Rr1 and the second variable resistor Rr2. The battery controller 1130 controls the first variable resistor Rr1 and the second variable resistor Rr2 such that the sum of the resistance value of the first variable resistor Rr1 and the value of first internal resistance Ri1 is the same as the sum of the resistance value of the second variable resistor Rr2 and the value of the second internal resistance Ri2. A time when the battery controller 1130 controls the first variable resistor Rr1 and the second variable resistor Rr2 is not limited, and the control may be performed, for example, at every constant time or at a time when the charging/discharging is finished.

For controlling the first variable resistor Rr1 and the second variable resistor Rr2, the battery controller 1130 detects the values of the first internal resistance Ri1 and the second internal resistance Ri2. The battery controller 1130 receives a first internal resistance value signal Si1 including resistance value information for the first internal resistance Ri1 and receives a second internal resistance value signal Si2 including resistance value information for the second internal resistance Ri2. The battery controller 1130 may receive the first internal resistance value signal Si1 from the first battery 1111 and the second internal resistance value signal Si2 from the second battery 1112, but the present inventive concept is not limited thereto. In addition, the battery controller 1130 may receive the first internal resistance value signal Si1 and the second internal resistance value signal Si2 from a separate internal resistance detection sensor. In addition, the battery controller 1130 may include a sensor for sensing the values of the first internal resistance Ri1 and the second internal resistance Ri2 to detect the respective resistance values. In the electronic device 1000 in which the charging/discharging occurs irregularly, the first internal resistance Ri1 and the second internal resistance Ri2 may be changed irregularly. Accordingly, the control for the first variable resistor Rr1 and the second variable resistor Rr2 may be performed right after the time of measuring the first internal resistance Ri1 and the second internal resistance Ri2.

The battery controller 1130 detects the resistance values of the first variable resistor Rr1 and the second variable resistor Rr2. The battery controller 1130 receives a first variable resistance value signal Sr1 including resistance value information for the first variable resistance Rr1 and receives a second variable resistance value signal Sr2 including resistance value information for the second variable resistance Rr2. The resistance values of the first variable resistor Rr1 and the second variable resistor Rr2 may be measured using a separate variable resistance detecting sensor included in the battery controller 1130. However, the present inventive concept is not limited thereto, and the battery controller 1130 may not detect the resistance values of the first variable resistor Rr1 and the second variable resistor Rr2. In this case, the battery controller 1130 may detect the values of the first internal resistance Ri1 and the second internal resistance Ri2 and calculate the resistance values of the first variable resistor Rr1 and the second variable resistor Rr2 on the basis of a difference value between the first internal resistance Ri1 and the second internal resistance Ri2 to control the first variable resistor Rr1 and the second variable resistor Rr2.

The battery controller 1130 compares the detected resistance values of the first variable resistor Rr1, the second variable resistor Rr2, the first internal resistance Ri1, and the second internal resistance Ri2 to generate a first variable signal Cr1 for controlling the first variable resistor Rr1 and a second variable signal Cr2 for controlling the second variable resistor Rr2. The first variable signal Cr1 is provided to the first variable resistor Rr1 and the second variable signal Cr2 is provided to the second variable resistor Rr2. For example, when the first variable resistor Rr1 and the second variable resistor Rr2 have MOSFET structures, the battery controller 130 may provide the first variable signal Cr1 to a gate terminal of the first variable resistor Rr1 and the second variable signal Cr2 to a gate terminal of the second variable resistor Rr2.

The battery controller 1130 controls the first variable resistor Rr1 and the second variable resistor Rr2 such that at least one of them has a minimum resistance value in a variable range. For example, when the first internal resistance Ri1 is greater by 10 mohms than the second internal resistance Ri2, the battery controller 1130 may control the first variable resistor Rr1 to have 20 mohms and the second variable resistor Rr2 to have 30 mohms. However, since the first variable resistor Rr1 and the second variable resistor Rr2 themselves may consume energies of the first battery 1111 and the second battery 1112, the first variable resistor Rr1 and the second variable resistor Rr2 may have resistance values as small as possible. In this case, the battery controller 1130 may identically subtract 20 mohms from each of the resistance values of the first variable resistor Rr1 and the second variable resistor Rr2 to control such that the first variable resistor Rr1 has 0 and the second variable resistor Rr2 has 10 mohms. In other words, the battery controller 1130 may remove offsets of the first variable resistor Rr1 and the second variable resistor Rr2.

The battery module 1100 of FIG. 4 is illustrated to include the first battery 1111 and the second battery 1112, but the present inventive concept is not limited thereto and a plurality of batteries may be connected in parallel. In addition, a plurality of variable resistors as many as the number of batteries may be disposed in the battery modules 1100. For example, the battery module 1100 may further include a third battery connected in parallel with the first battery 1111 and the second battery 1112, and further include a third variable resistor connected to a cathode terminal or an anode terminal of the third battery. In this case, the battery controller 1130 detects a resistance value of the third variable resistor and a value of a third internal resistance included in the third battery. The battery controller 1130 adds the resistance value of the third variable resistor to a value of the third internal resistance to calculate a resistance value of a third serial resistor. The battery controller 1130 controls resistance values of the first to third variable resistors such that resistance values of the first to third serial resistors are equal to each other, but at least one of the resistance values of the first to third variable resistors has a minimum resistance value in a variable range.

Figure 5:
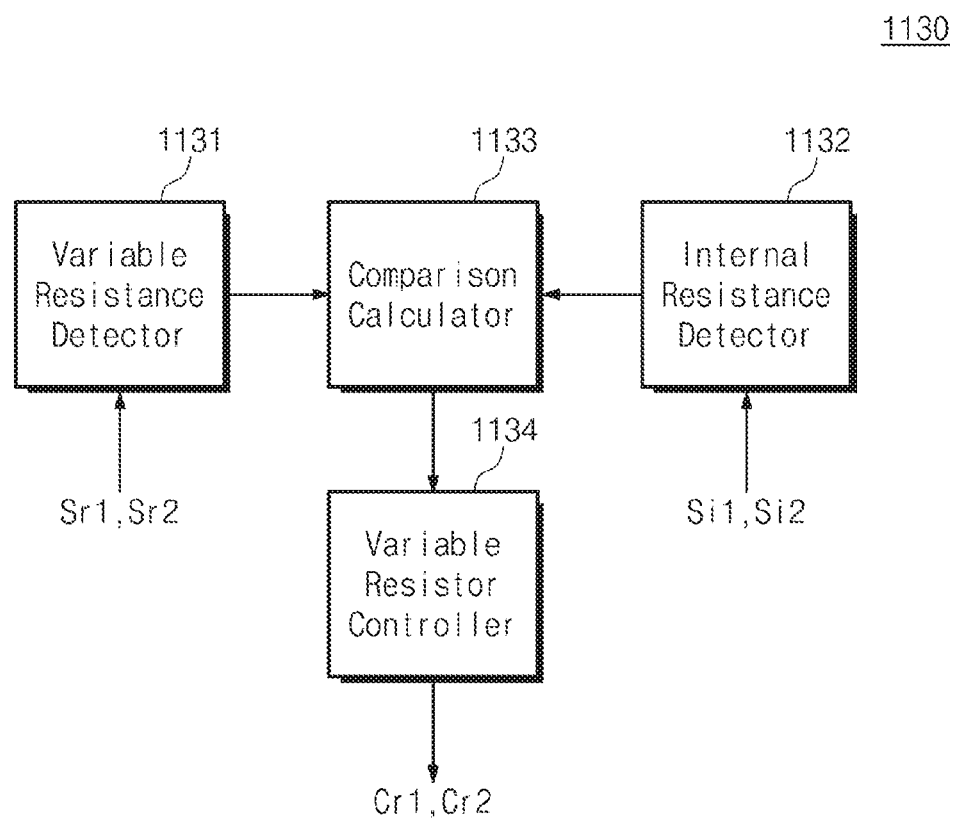
FIG. 5 is a block diagram illustrating a battery controller of FIG. 4.

FIG. 5 is a block diagram illustrating a battery controller of FIG. 4.

Referring to FIG. 5, the battery controller 1130 includes a variable resistance detector 1131, an internal resistance detector 1132, a comparison calculator 1133, and a variable resistor controller 1134.

The variable resistance detector 1131 receives the first variable resistance value signal Sr1 and the second variable resistance signal Sr2. The variable resistance detector 1131 may generate first variable resistance value data and second variable resistance value data on the basis of the first variable resistance value signal Sr1 and the second variable resistance value signal Sr2. The first variable resistance value data may be a digital signal including resistance value information for the first variable resistor Rr1 and the second variable resistance value data may be a digital signal including resistance value information for the second variable resistor Rr2 The first variable resistance value signal Sr1 and the second variable resistance value signal Sr2 may be analog signals and the variable resistance detector 1131 may include an A/D converter for converting an analog signal to a digital signal.

The internal resistance detector 1132 receives the first internal resistance value signal Si1 and the second internal resistance value signal Si2. The internal resistance detector 1132 may generate first internal resistance value data and second internal resistance value data on the basis of the first internal resistance value signal Si1 and the second internal resistance value signal Si2. The first internal resistance value data may be a digital signal including resistance value information for the first internal resistance Ri1 and the second internal resistance value data may be a digital signal including resistance value information for the second internal resistance Ri2. The first internal resistance value signal Si1 and the second internal resistance value signal Si2 may be analog signals and the internal resistance detector 1132 may include an A/D converter for converting an analog signal to a digital signal.

The variable resistance detector 1131 and the internal resistance detector 1132 are illustrated separately, but the present inventive concept is not limited thereto, and an element for detecting the variable resistance and the internal resistance may receive the first internal resistance value signal Si1, the second internal resistance value signal Si2, the first variable resistance value signal Sr1, and the second variable resistance value signal Sr2 to perform digital conversion thereon.

The comparison calculator 1133 receives the first variable resistance value data and the second variable resistance value data from the variable resistance detector 1131. The comparison calculator 1133 receives the first internal resistance value data and the second internal resistance value data from the internal resistance detector 1132. The comparison calculator 1133 adds the first variable resistance value data to the first internal resistance value data to generate first serial resistance value data. The comparison calculator 1133 adds the second variable resistance value data to the second internal resistance value data to generate second serial resistance value data. The comparison calculator 1133 may include an adder for generating the first serial resistance value data and the second serial resistance value data.

The comparison calculator 1133 may include a comparator for comparing the first serial resistance value data with the second serial resistance value data. When the first serial resistance value data is greater than the second serial resistance value data, the comparison calculator 1133 may increase the second variable resistance value data in order to increase the resistance value of the second variable resistor Rr2, or decrease the first variable resistance value data in order to decrease the resistance value of the first variable resistor Rr1. When the first serial resistance value data is smaller than the second serial resistance value data, the comparison calculator 1133 may decrease the first variable resistance value data in order to decrease the resistance value of the first variable resistor Rr1, or increase the second variable resistance value data in order to increase the resistance value of the second variable resistor Rr2.

The comparison calculator 1133 may perform a calculation for removing an offset such that at least one of the value of the first internal resistance Ri1 and the value of the second internal resistance Ri2 has a minimum value in a variable range. The comparison calculator 1133 may include a subtractor for subtracting an identical data value from the first variable data and the second variable data in order to perform an offset removing calculation. The comparison calculator 1133 may perform first offset removal and provide the corrected first variable resistance value data and the corrected second variable resistance value data to the variable resistor controller 1134.

The variable resistor controller 1134 receives, from the comparison calculator 1133, the corrected first variable resistance value data or the corrected second variable resistance value data for controlling the first variable resistor Rr1 and the second variable resistor Rr2. The variable resistor controller 1134 generates a first variable signal Cr1 and a second variable signal Cr2 on the basis of the received data from the comparison calculator 1133. The first variable signal Cr1 may be an analog signal for determining the resistance value of the first variable resistor Rr1. The second variable signal Cr2 may be an analog signal for determining the resistance value of the second variable resistor Rr2. For example, the first variable signal Cr1 may correspond to a gate voltage of the first variable resistor Rr1 formed of a MOSFET. The second variable signal Cr2 may correspond to a gate voltage of the second variable resistor Rr2 formed of a MOSFET. The variable resistor controller 1134 may include a D/A converter for converting a digital signal to an analog signal.

Figure 6:
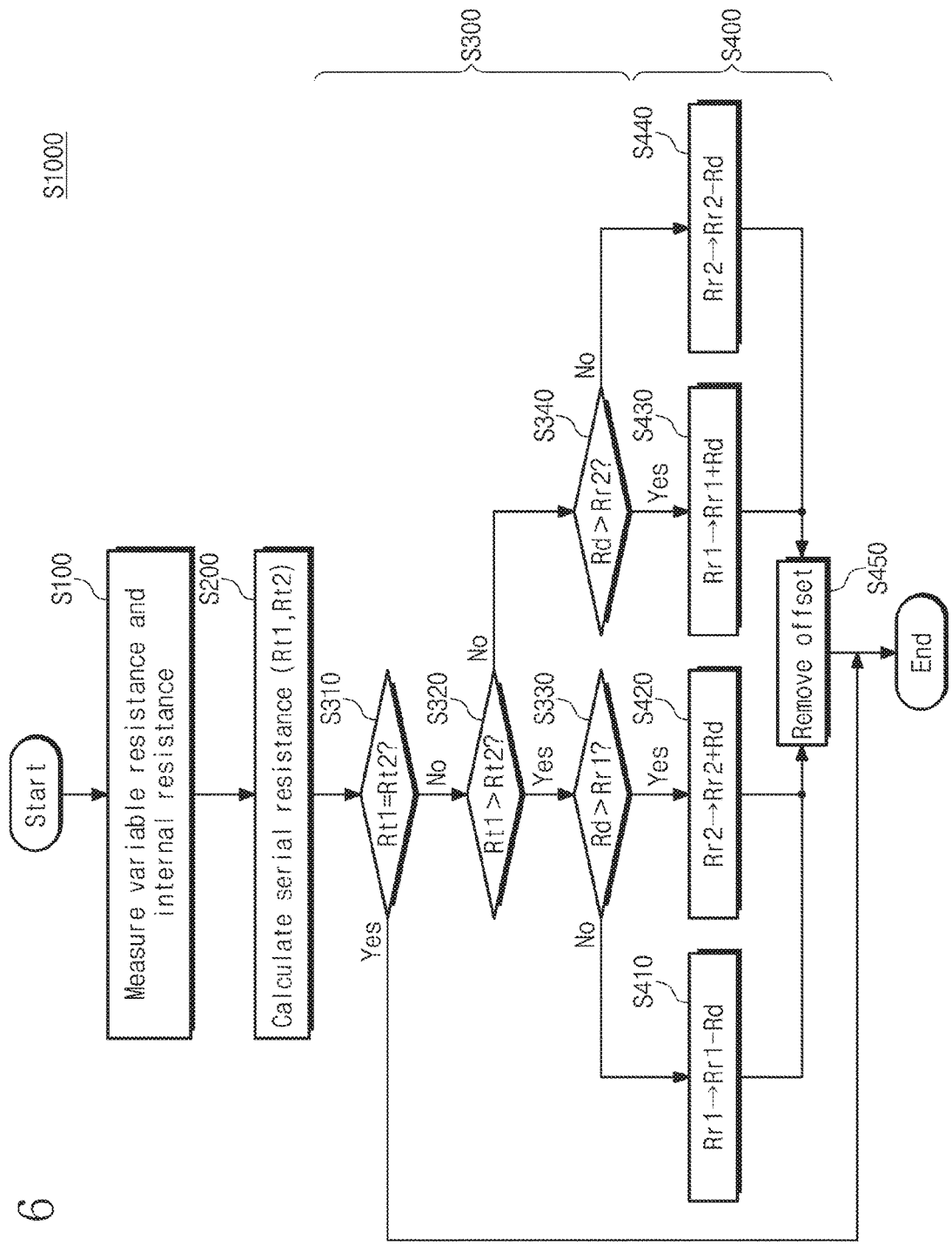
FIG. 6 is a flow chart illustrating a method for driving a battery module according to an embodiment of the inventive concept.

FIG. 6 is a flow chart illustrating a method for driving a battery module according to an embodiment of the inventive concept.

Referring to FIG. 6, a method S1000 for driving a battery controller includes: measuring variable resistance and internal resistance (operation S100); calculating serial resistance (operation S200); comparing resistance values (operation S300); and controlling the variable resistance (operation S400). The comparing of the resistance values (operation S300) includes: comparing first serial resistance and second serial resistance (operations S310 and S320); comparing first variable resistance and a correction value (operation S330); and comparing second variable resistance and the correction value (operation S340). The controlling of the variable resistance (operation S400) includes: subtracting the correction value from the first variable resistance (operation S410); adding the correction value to the second variable resistance (operation S420); adding the correction value to the first variable resistance (operation S430); subtracting the correction value from the second variable resistance (operation S440); and removing an offset (operation S450).

In the measuring of the variable resistance and the internal resistance (operation S100), the resistances of the first variable resistor Rr1 and the second variable resistor Rr2, and the first internal resistance Ri1 and the second internal resistance Ri2 are measured. The battery controller 1130 may convert the measured resistance values to data for comparison and calculation.

In the calculating of the serial resistance (operation S200), the battery controller 1130 calculates the first serial resistance Rt1 and the second serial resistance Rt2. The calculating of the serial resistance (operation S200) may be performed by the comparison calculator 1133 of FIG. 5. The value of the first serial resistance Rt1 is a sum of the value of the first internal resistance Ri1 and the resistance value of the first variable resistor Rr1. The value of the second serial resistance Rt2 is a sum of the value of the second internal resistance Ri2 and the resistance value of the second variable resistor Rr2.

In the comparing of the first serial resistance and the second serial resistance (operations S310 and S320), when the value of the first serial resistance Rt1 is identical to the value of the second serial resistance Rt2, since the first current I1 is identical to the second current I2, the variable resistor control may be finished. Unlike FIG. 6, when the value of the first serial resistance Rt1 is identical to the value of the second serial resistance Rt2, the removing of the offset may be proceeded. In other words, subtraction may be performed such that at least one of the first variable resistor Rr1 and the second variable Rr2 has a minimum resistance value in a variable range. For example, subtraction may be performed such that at least one resistance value of the first variable resistor Rr1 and the second variable Rr2 is 0.

When the value of the first serial resistance Rt1 is greater than the value of the second serial resistance Rt2, the comparing of the correction value with the first variable resistance (operation S330) is proceeded. When the value of the first serial resistance Rt1 is smaller than the value of the second serial resistance Rt2, the comparing of the correction value with the second variable resistance (operation S340) is proceeded. The correction value Rd is an absolute value of a difference between the values of the first serial resistance Rt1 and the second serial resistance Rt2. In the comparing of the correction value with the first variable resistance (operation S330), the correction value Rd is a result value obtained by subtracting the value of the second serial resistance Rt2 from the value of the first serial resistance Rt1. In the comparing of the correction value with the second variable resistance (operation S340), the correction value Rd is a result value obtained by subtracting the value of the first serial resistance Rt1 from the value of the second serial resistance Rt2.

In the comparing of the correction value with the first variable resistance (operation S330), when the resistance value of the first variable resistor Rr1 is greater than the correction value Rd, the subtracting of the correction value from the first variable resistance (operation S410) is proceeded. When the correction value Rd is subtracted from the first variable resistance Rr1, the first serial resistance Rt1 and the second serial resistance Rt2 have an identical value. Accordingly, when the first power source E1 and the second power source E2 have an identical voltage level, the first current I1 and the second current I2 have an identical magnitude.

In the comparing of the correction value with the first variable resistance (operation S330), when the resistance value of the first variable resistor Rr1 is smaller than the correction value Rd, the adding of the correction value to the second variable resistance (operation S420) is proceeded. When the correction value Rd is added to the second variable resistance Rr2, the first serial resistance Rt1 and the second serial resistance Rt2 have an identical value.

In the comparing of the correction value with the second variable resistance (operation S340), when the resistance value of the second variable resistor Rr2 is greater than the correction value Rd, the adding of the correction value to the first variable resistance (operation S430) is proceeded. When the correction value Rd is added to the first variable resistance Rr1, the first serial resistance Rt1 and the second serial resistance Rt2 have an identical value.

In the comparing of the correction value with the second variable resistance (operation S340), when the resistance value of the second variable resistor Rr2 is smaller than the correction value Rd, the subtracting of the correction value from the second variable resistance (operation S440) is proceeded. When the correction value Rd is subtracted from the second variable resistance Rr2, the first serial resistance Rt1 and the second serial resistance Rt2 have an identical value.

When the first variable resistor Rr1 and the second variable resistor Rr2 have specific resistance values that are greater than 0, power consumption occurs due to the first variable resistor Rr1 and the second variable resistor Rr2. In order to minimize such power consumption, the removing of the offset (operation S450) is proceeded. In the removing of the offset (operation S450), subtraction may be performed such that at least one of the first variable resistor Rr1 and the second variable Rr2 has a minimum resistance value in a variable range. For example, subtraction may be performed such that at least one resistance value of the first variable resistor Rr1 and the second variable Rr2 is 0.

Unlike FIG. 6, in a method S1000 for driving the battery controller, without separately including the removing of the offset (operation S450), an offset removing calculation may be concurrently performed in the adding or subtracting of the correction value Rd to or from the resistance value of the first variable resistance Rr1 or the second variable resistance Rr2 (operations S410 to S440). For example, in the adding of the correction value to the second variable resistance, subtraction is performed to make the resistance value of the first variable resistor Rr1 be 0 such that the magnitude of the correction value Rd is reduced as much as the reduced resistance value of the first variable resistor Rr1. When the reduced correction value Rd is added to the resistance value of the second variable resistor Rr2, the values of the first serial resistance Rt1 and the second serial resistance Rt2 are identical to the value of the first internal resistance Ri1. In this case, since the first variable resistor Rr1 has a minimum value in a variable range, the removing of the offset is not required separately.

Figure 7:
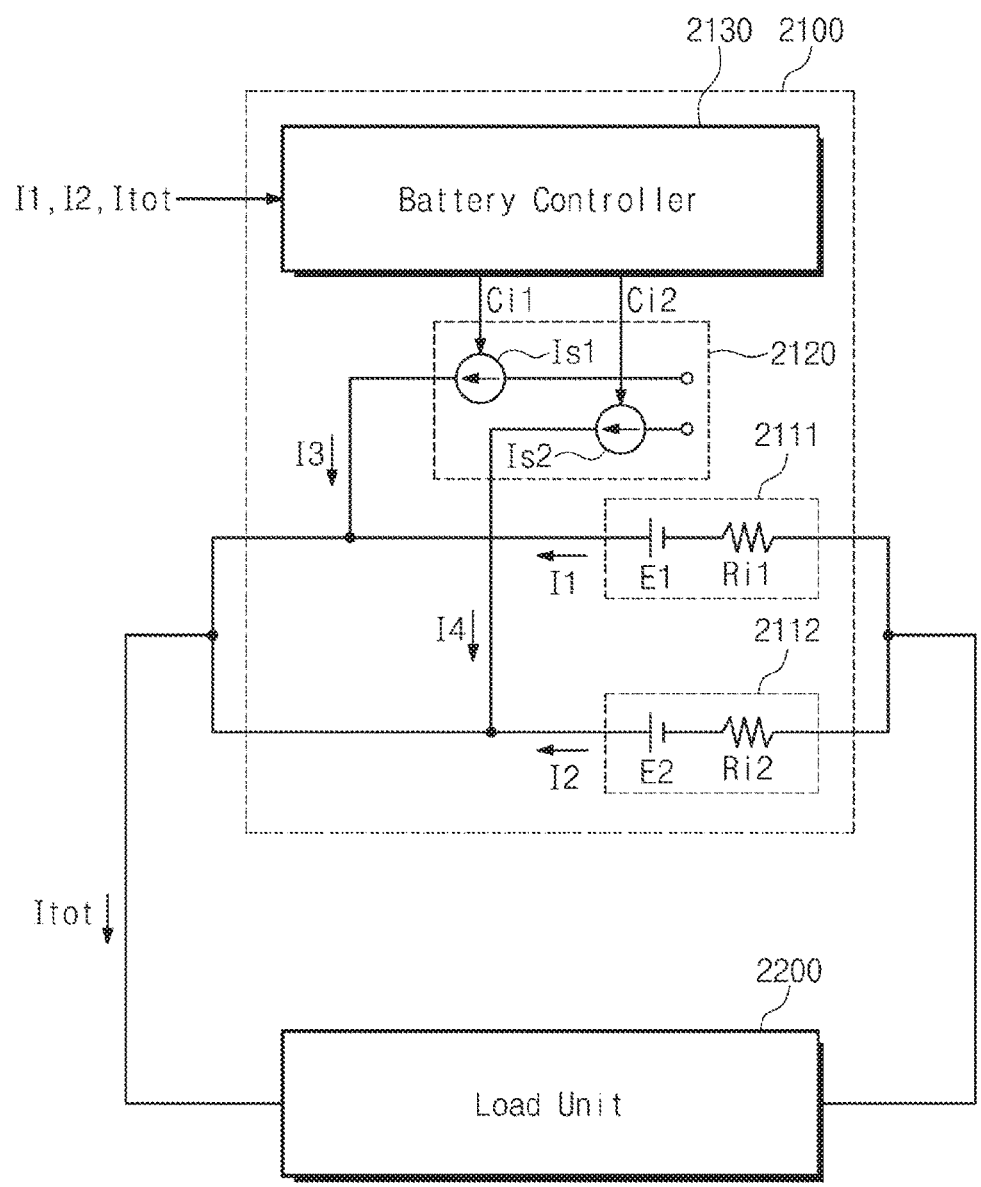
FIG. 7 is a block diagram of an electronic device according to another embodiment of the present inventive concept.

FIG. 7 is a block diagram of an electronic device according to another embodiment of the present inventive concept.

Referring to FIG. 7, an electronic device 2000 includes a battery module 2100 and a load unit 2200. The battery module 2100 includes a first battery 2111, a second battery 2112, a correction element unit 2120, and a battery controller 2130. The first battery 2111, the second battery 2112 and the load unit 2200 perform the substantially same functions as those of the first battery 11_1, the second battery 11-2 and the load unit 20 of FIG. 1, and therefore a detailed description thereabout will be omitted.

The correction element unit 2120 includes a first current source Is1 and a second current source Is2. The first current source Is1 is electrically connected to the first battery 2111. The second current source Is2 is electrically connected to the second battery 2112. The first current source Is1 and the second current source Is2 may be driven using one having a higher voltage or having a lower internal resistance between the first battery 2111 and the second battery 2112. Alternatively, in order that the correction element unit 2120 influences a voltage of the first battery 2111 or the second battery 2112 to prevent a change in internal resistance, the first current source Is1 and the second current source Is2 may be driven using a separate external power source.

The first current source Is1 generates a third current I3, and the second current source Is2 generates a fourth current I4. A sum of the first current I1 and the third current I3 is equal to a first correction current, and a sum of the second current I2 and the fourth current I4 is equal to a second correction current. A sum of the first correction current and the second correction current is equal to the load current Itot. The first current source Is1 and the second current source Is2 prevent overcharging and deep-discharging of the first battery 2111 and the second battery 2112. In other words, charging/discharging occurs non-uniformly in the first battery 2111 and the second battery 2112 due to a difference in internal resistance. Accordingly, a difference between degrees of charging and discharging is generated between the first battery 2111 and the second battery 2112, which leads to deterioration of battery life. The first current source Is1 and the second current source Is2 compensate a current difference between batteries connected in parallel and improve performance of the battery module 2100 by adjusting the first correction current and the second correction current to have an identical magnitude. In addition, unlike FIG. 4, the correction element unit 2120 does not have a variable resistor, and thus power consumption caused by resistance may be minimized.

The battery controller 2130 controls current values of the first current source Is1 and the second current source Is2. The battery controller 2130 may determine magnitudes of the third current I3 and the fourth current I4 on the basis of a difference between the first current I1 and the second current I2. In detail, the battery controller 2130 detects the first current I1 and the second current I2. The battery module 2100 may further include a current meter for detecting the first current I1 and the second current I2. Alternatively, the battery controller 2130 may detect the magnitudes of the first current I1 and the second current I2. The battery controller 2130 may add the magnitude of the first current I1 to the magnitude of the second current I2 and calculate the load current Itot. Alternatively, the battery controller 2130 may directly detect the magnitude of the load current Itot from the outside. The battery controller 2130 may divide the magnitude of the load current Itot by the number of the batteries connected in parallel to calculate magnitudes of the first correction current and the second correction current. When two batteries are connected in parallel as in FIG. 7, the battery controller 2130 may determine a half of magnitude of the load current Itot as the magnitudes of the first correction current and the second correction current.

The battery controller 2130 generates a first current source control signal Ci1 and a second current source control signal Ci2 on the basis of the determined first correction current and second correction current. The battery controller 2130 may provide the first current source control signal Ci1 to the first current source Is1 and the second current source control signal to the second current source Is2. The battery controller 2130 controls the first current source Is1 such that a sum of the first current I1 and the third current I3 is equal to the first correction current. The battery controller 2130 controls the second current source Is2 such that a sum of the second current I2 and the fourth current I4 is equal to the second correction current.

The battery module 2100 of FIG. 7 is illustrated to include the first battery 2111 and the second battery 2112, but the present inventive concept is not limited thereto and a plurality of batteries may be connected in parallel. In addition, a plurality of variable resistors as many as the number of batteries may be disposed in the battery modules 2100. For example, the battery module 2100 may further include a third battery connected in parallel with the first battery 2111 and the second battery 2112, and further include a third current source connected to the third battery. In this case, the battery controller 2130 may detect a current due to the third battery and determine a value obtained by dividing the load current Itot by 3 as the third correction current. The battery controller 2130 controls the third current source such that a sum of a current from the third current source and a current due to the third battery is equal to the third correction current.

The battery module 2100 of FIG. 7 may further include a first variable resistor connected in series with the first battery 2111 and a second variable resistor connected in series with the second battery 2112. The battery controller 2130 may selectively operate the variable resistors and the current sources in order to compensate for a difference between values of the first internal resistance Ri1 and the second internal resistance Ri2. In this case, the battery module 2100 may select a correction element in consideration of operation convenience of the variable resistors and detailed adjustment of the current sources.

Figure 8:
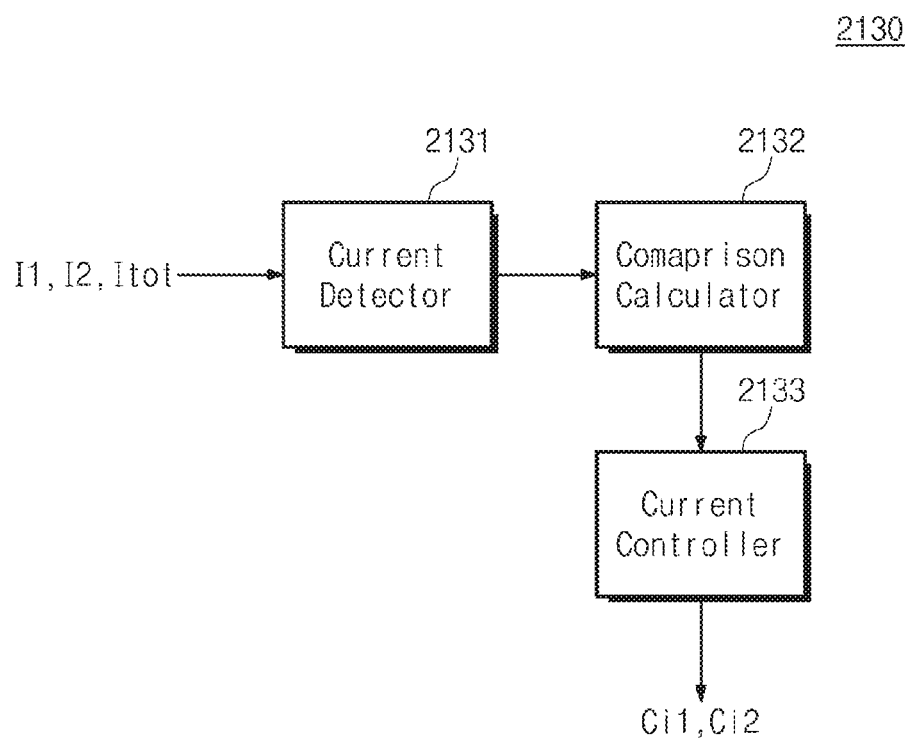
FIG. 8 is a block diagram illustrating a battery controller of FIG. 7.

FIG. 8 is a block diagram illustrating a battery controller of FIG. 7.

Referring to FIG. 8, the battery controller 2130 includes a current detector 2131, a comparison calculator 2132, and a current controller 2133.

The current detector 2131 receives the first current I1, the second current I2, and the load current Itot. The current detector 2131 may generate first current data and second current data on the basis of the first current I1 and the second current I2. The current detector 2131 may generate load current data on the basis of the load current Itot. The first current data may be a digital signal including magnitude information for the first current I1 and the second current data may be a digital signal including magnitude information for the second current I2. The current detector 2131 may include an A/D converter for converting the first current I1 and the second current I2 to the first current data and the second current data.

The comparison calculator 2132 receives the first current data and the second current data. The comparison calculator 2132 may receive the load current data including the magnitude information for the load current Itot, or add the first current data to the second current data to generate the load current data. The comparison calculator 2132 may determine a value obtained by dividing a load current data value by 2 as correction data. The correction data corresponds to magnitudes of the first correction current and the second correction current. The comparison calculator 2132 compares the correction data with the first current data to generate third current data on the basis of a difference therebetween. The comparison calculator 2132 compares the correction data with the second current data to generate fourth current data on the basis of a difference therebetween. For example, the comparison calculator 2132 may subtract the first current data from the correction data to generate the third current data. The comparison calculator 2132 may subtract the second current data from the correction data to generate the fourth current data. The comparison calculator 2132 may include a comparator for comparing the correction data with the first current data, or the correction data with the second current data.

The current controller 2133 receives, from the comparison calculator 2132, the third current data and the fourth current data for controlling the first current source Is1 and the second current source Is2. The current controller 2133 generates the first current source control signal Ci1 on the basis of the third current data and generates the second current source control signal Ci2 on the basis of the fourth current data. The first current source control signal Ci1 and the second source current control signal Ci2 may be analog signals for determining magnitudes of currents provided by the first current source Is1 and the second current source Is2. The current controller 2133 may include a D/A converter for converting a digital signal to an analog signal.

Figure 9:
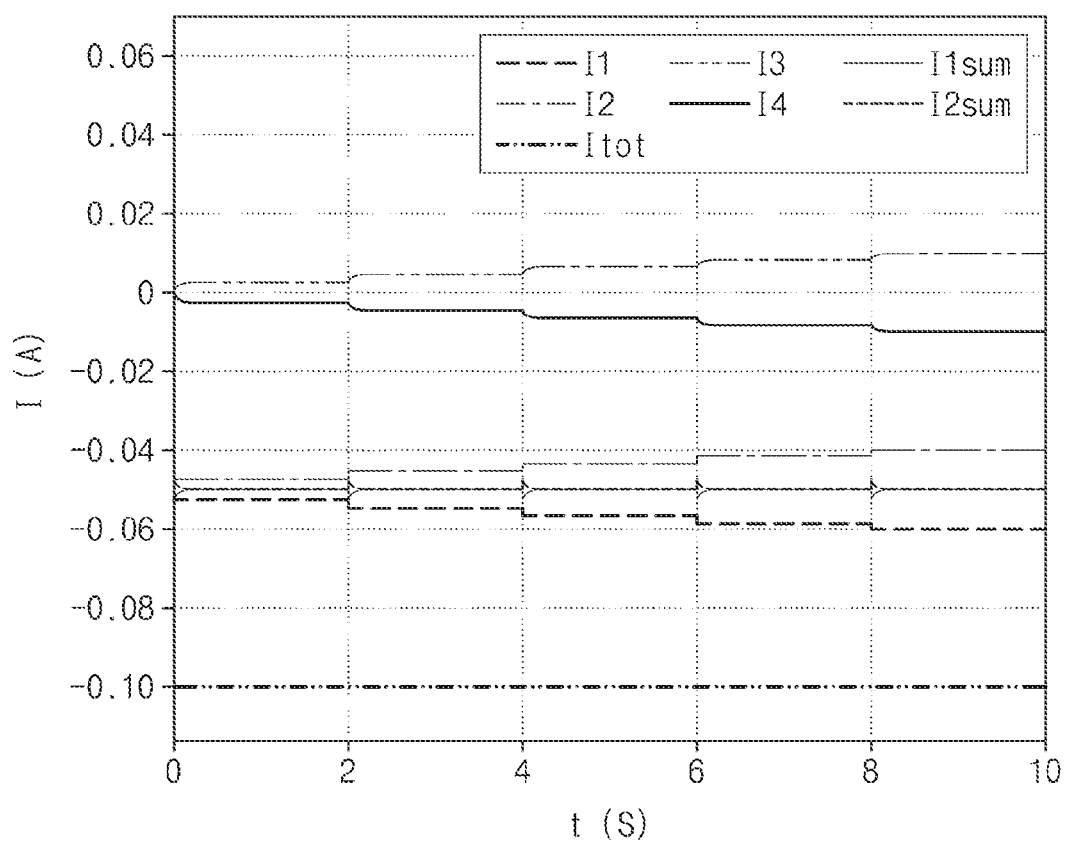
FIG. 9 is a graph illustrating a current change according to an operation of the battery module of FIG. 7.

FIG. 9 is a graph illustrating a current change according to an operation of the battery module of FIG. 7.

Referring to FIG. 9, illustrated are magnitudes of the first to fourth currents I1 to I4, a magnitude of the load current Itot, and magnitudes of the first and second correction currents I1sum and I2 sum according to time. The first power source E1 and the second power source E2 are assumed to output 3.7 V, and first internal resistance Ri1 is fixed to 20 mohms. Second internal resistance Ri2 varies according to a flow of time. From 0 to 2 seconds, the second internal resistance Ri2 is 22 mohms. From 2 to 4 seconds, the second internal resistance Ri2 is 24 mohms. From 4 to 6 seconds, the second internal resistance Ri2 is 26 mohms. From 6 to 8 seconds, the second internal resistance Ri2 is 28 mohms. From 8 to 10 seconds, the second internal resistance Ri2 is 30 mohms.

When the correction element unit 2120 does not perform current correction, as the second internal resistance Ri2 increases, the magnitudes of the first current I1 and the second current I2 are changed. As a resistance value difference between the first internal resistance Ri1 and the second internal resistance Ri2 increases, a magnitude difference between the first current I1 and the second current I2 increases. At the time of charging as in FIG. 9, since the more current flows through the first battery 2111 than the second battery 2112, the first battery 2111 may be overcharged. Alternatively, since provision or reception of the current by the electronic device 2000 is weighted towards the first battery 2111, the life of the first battery 2111 is reduced.

When current correction is performed by the correction element unit 2120, the first current source Is1 provides the third current I3 and the second current source Is2 provides the fourth current I4. A sum of the first current I1 and the third current I3 is equal to the first correction current I1sum, and a sum of the second current I2 and the fourth current I4 is equal to the second correction current I2sum. Even when the second internal resistance Ri2 is changed sharply according to time, the battery controller 2130 immediately detects the current change caused by the second internal resistance Ri2 and controls the first current source Is1 and the second current source Is2 such that the first correction current I1sum and the second correction current I2 sum have 0.05 A that is a half of the load current Itot. The first current source Is1 and the second current source Is2 may compensate for the changed first current I1 and second current I2 stably and swiftly.

A battery module and an electronic device including the same according to embodiments of the present invention may correct a difference in current value, which is caused by an internal resistance difference between batteries connected in parallel, to enhance the battery life.

The foregoing description is about detailed examples for practicing the inventive concept. The present disclosure includes not only the above-described embodiments but also simply changed or easily modified embodiments. In addition, the inventive concept may also include technologies obtained by easily modifying and practicing the above-described embodiments.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:
1. A battery module comprising:
a first battery comprising a first internal resistance;
a second battery connected to the first battery in parallel and comprising a second internal resistance;
a first variable resistor connected to the first battery in series;
a second variable resistor connected to the second battery in series; and
a battery controller configured to control a resistance of at least one of the first variable resistor and the second variable resistor such that a first serial resistance value that is a sum of a value of the first internal resistance and a resistance value of the first variable resistor is identical to a second serial resistance value that is a sum of a value of the second internal resistance and a resistance value of the second variable resistor, and to control the resistance of at least one of the first variable resistor and the second variable resistor such that at least one of the first variable resistor and the second variable resistor has a minimum resistance value in a predetermined range.

2. The battery module of claim 1, wherein the battery controller is configured to add the value of the first internal resistance to the resistance value of the first variable resistor to calculate the first serial resistance value, to add the value of the second internal resistance to the resistance value of the second variable resistor to calculate the second serial resistance value, and to compare the first serial resistance value with the second serial resistance value to control the first variable resistor or the second variable resistor.

3. The battery module of claim 1, wherein the battery controller is configured to calculate a correction value that is an absolute value of a difference between the first serial resistance value and the second serial resistance value, and to control the first variable resistor or the second variable resistor on a basis of the correction value.

4. The battery module of claim 3, wherein the battery controller is configured to compare the resistance value of the first variable resistor with the correction value, when the first serial resistance value is greater than the second serial resistance value,
to control to add the correction value to the resistance value of the second variable resistor, when the resistance value of the first variable resistor is smaller than the correction value, and
to control to subtract the correction value from the resistance value of the first variable resistor, when the resistance value of the first variable resistor is greater than the correction value.

5. The battery module of claim 4, wherein the battery controller is configured to subtract an identical value from the resistance value of the first variable resistor and the resistance value of the second variable resistor to control the resistance of at least one of the first variable resistor and the second variable resistor such that at least one resistance value of the first variable resistor and the second variable resistor is 0.

6. The battery module of claim 3, wherein the battery controller is configured to compare the resistance value of the second variable resistor with the correction value, when the first serial resistance value is smaller than the second serial resistance value,
to control to add the correction value to the resistance value of the first variable resistor, when the resistance value of the second variable resistor is smaller than the correction value, and
to control to subtract the correction value from the resistance value of the second variable resistor, when the resistance value of the second variable resistor is greater than the correction value.

7. The battery module of claim 6, wherein the battery controller is configured to subtract an identical value from the resistance value of the first variable resistor and the resistance value of the second variable resistor to control the resistance of at least one of the first variable resistor and the second variable resistor such that at least one resistance value of the first variable resistor and the second variable resistor is 0.

8. The battery module of claim 1, wherein the battery controller is configured to provide, to the first variable resistor, a first variable signal for controlling the resistance value of the first variable resistor, and to provide, to the second variable resistor, a second variable signal for controlling the resistance value of the second variable resistor on the basis of the value of the first internal resistance and the value of the second internal resistance.

9. The battery module of claim 8, wherein the battery controller comprises:
a variable resistance detector configured to receive a first variable resistance value signal from the first variable resistor and to receive a second variable resistance signal from the second variable resistor;
an internal resistance detector configured to receive a first internal resistance value signal from the first battery and to receive a second internal resistance value signal from the second battery;
a comparison calculator configured to calculate the resistance values of the first variable resistor and the second variable resistor on a basis of the first variable resistance value signal, the second variable resistance value signal, the first internal resistance value signal, and the second internal resistance value signal; and
a variable resistor controller configured to generate the first variable signal and the second variable signal on a basis of the resistance values of the first variable resistor and the second variable resistor, which are calculated by the comparison calculator.

10. The battery module of claim 1, further comprising:
a third battery connected to the first battery and the second battery in parallel and comprising a third internal resistance; and
a third variable resistor connected to the third battery in series;
wherein the battery controller is configured to control a resistance of at least one of the first to third variable resistors such that a third serial resistance value that is a sum of a value of the third internal resistance and a resistance value of the third variable resistor is equal to the first serial resistance value and the second serial resistance value, and to control the resistance of at least one of the first to third variable resistors such that at least one of the first to third variable resistors has a minimum resistance value in the predetermined range.

11. A battery module comprising:
a first battery configured to provide a first current;
a second battery connected to the first battery in parallel and configured to provide a second current;
a first current source connected to the first battery and configured to provide a third current;
a second current source connected to the second battery and configured to provide a fourth current; and
a battery controller configured to control the first current source and the second current source such that a first correction current that is a sum of the first current and the third current is equal to a second correction current that is a sum of the second current and the fourth current.

12. The battery module of claim 11, wherein the battery controller is configured to add the first current to the second current to calculate a magnitude of a load current, and to control the first current source and the second current source such that a sum of the first to fourth currents is equal to the magnitude of the load current.

13. The battery module of claim 12, wherein the battery controller is configured to control the first current source and the second current source such that magnitudes of the first correction current and the second correction current are a half of the magnitude of the load current.

14. The battery module of claim 12, wherein the battery controller is configured to control the first current source and the second current source such that the third current and the fourth current have an identical magnitude and opposite polarities.

15. The battery module of claim 12, wherein the first current source and the second current source receive voltages from one having a lower internal resistance value between the first and second batteries.

16. The battery module of claim 11, wherein the battery controller comprises:
a current detector configured to detect the first current and the second current; and
a comparison calculator configured to compare the first current and the second current detected by the current detector, and to calculate the third current and the fourth current, and
wherein the battery controller is configured to provide a first current source control signal to the first current source and a second current source control signal to the second current source on a basis of the third current and the fourth current calculated by the comparison calculator.

17. The battery module claim 11, further comprising:
a third battery connected to the first battery and the second battery in parallel and configured to provide a fifth current; and
a third current source connected to the third battery and configured to provide a sixth current, and
wherein the battery controller is configured to control the third current source such that a third correction current that is a sum of the fifth current and the sixth current is equal to the first correction current and the second correction current.

18. An electronic device comprising:
a battery module configured to generate a load current; and
a load unit configured to receive the load current,
wherein the battery module comprises:
a first battery comprising a first internal resistance and configured to provide a first current;
a second battery connected to the first battery in parallel, comprising a second internal resistance, and configured to provide a second current;
a correction element unit connected to the first battery and the second battery; and
a battery controller configured to control the correction element unit such that the first current is identical to the second current on a basis of a difference between values of the first internal resistance and the second internal resistance.

19. The battery module of claim 18, wherein the correction element unit comprises:
a first variable resistor connected to the first battery in series; and
a second variable resistor connected to the second battery in series,
wherein the battery controller is configured to control the first variable resistor or the second variable resistor such that the difference between the values of the first internal resistance and the second internal resistance is added to a resistance value of the first variable resistor or the second variable resistor.

20. The battery module of claim 18, wherein the correction element unit comprises:
a first current source connected to the first battery; and
a second current source connected to the second battery,
wherein the battery controller is configured to detect a change in the first current or the second current to control the first current source or the second current source such that a magnitude of the first current or the second current is maintained.

* * * * *